United States Patent
Todd et al.

(10) Patent No.: US 6,790,520 B1
(45) Date of Patent: Sep. 14, 2004

(54) VIBRATION DAMPENING LAMINATE

(75) Inventors: John Todd, Farmington Hills, MI (US); Robert S. Boyd, Hillsdale, MI (US); Melvyn J. Care, Kitchener (CA)

(73) Assignee: Collins & Aikman Products Co., Troy, MI (US)

( * ) Notice: Subject to any disclaimer, the term of this patent is extended or adjusted under 35 U.S.C. 154(b) by 573 days.

(21) Appl. No.: 09/619,873

(22) Filed: Jul. 20, 2000

Related U.S. Application Data

(63) Continuation of application No. 08/968,930, filed on Nov. 12, 1997.

(51) Int. Cl.$^7$ ................................................. B32B 9/04
(52) U.S. Cl. ................ 428/318.4; 428/40.1; 428/41.8; 428/85; 428/95; 428/304.4; 428/308.4; 428/317.1; 428/317.7; 428/319.3; 428/319.7; 428/343; 428/344; 428/352; 428/355 AC; 428/606; 428/607; 442/30; 442/221; 442/228; 442/232; 442/370; 442/376; 442/378; 52/167.1; 52/167.7; 52/167.8; 52/167.9; 181/284; 181/290; 181/292; 181/294
(58) Field of Search ............... 428/40.1, 41.8, 428/606, 607, 304.4, 308.4, 317.1, 317.7, 318.4, 319.3, 319.7, 343, 344, 352, 355 AC, 85, 95; 52/167.1, 167.7, 167.8, 167.9; 181/284, 290, 292, 294; 188/378; 248/562, 636; 442/30, 221, 228, 232, 370, 376, 378

(56) References Cited

U.S. PATENT DOCUMENTS

| | | | |
|---|---|---|---|
| 3,620,366 A | 11/1971 | Parkinson et al. | 206/59 C |
| 4,045,076 A | 8/1977 | Day, Sr. et al. | 296/39 A |
| 4,056,161 A * | 11/1977 | Allen, Jr. | 181/290 |
| 4,151,319 A | 4/1979 | Sackoff et al. | 428/40 |
| 4,199,634 A | 4/1980 | Pole et al. | 428/95 |
| 4,272,572 A | 6/1981 | Netherly | 428/35 |
| 4,374,172 A * | 2/1983 | Schwarz et al. | 428/308.4 |
| 4,377,614 A | 3/1983 | Alfter et al. | 428/213 |
| 4,468,431 A * | 8/1984 | Okey | 428/317.7 |
| 4,470,857 A | 9/1984 | Casalou | 156/66 |
| 4,479,992 A | 10/1984 | Haeseker et al. | 428/116 |
| 4,741,945 A | 5/1988 | Brant et al. | 428/158 |
| 4,823,909 A | 4/1989 | Nakamura et al. | 181/290 |
| 4,828,910 A | 5/1989 | Haussling | 428/284 |
| 4,863,791 A | 9/1989 | Steward et al. | 428/310.5 |
| 4,906,501 A | 3/1990 | Honma et al. | 428/68 |
| 5,005,898 A | 4/1991 | Benedetto et al. | 296/194 |
| 5,094,318 A | 3/1992 | Maeda et al. | 181/290 |
| 5,134,014 A | 7/1992 | Zaima et al. | 428/186 |

(List continued on next page.)

FOREIGN PATENT DOCUMENTS

| | | | | |
|---|---|---|---|---|
| EP | 0027945 | 10/1979 | | |
| FR | 2560953 | 3/1985 | | |
| FR | 2560953 | * 9/1985 | | B32B/15/08 |
| FR | 2713169 | 12/1993 | | |
| FR | 2713169 | * 6/1995 | | B60R/13/08 |

OTHER PUBLICATIONS

Notification of Transmittal of International Search Report of the Declaration PCT/US98/20812.

*Primary Examiner*—Ula C. Ruddock
(74) *Attorney, Agent, or Firm*—Myers Bigel Sibley & Sajovec, PA

(57) ABSTRACT

The present invention provides a vibration dampening laminate that is lightweight and has superior sound insulation and vibration dampening properties. The vibration dampening laminate comprises a constraining layer, a viscoelastic adhesive layer, a foam spacing layer and a pressure sensitive adhesive layer including a release layer. The pressure sensitive adhesive layer and release layer are contoured to fit a profile of the article being soundproofed and vibration dampened.

5 Claims, 2 Drawing Sheets

U.S. PATENT DOCUMENTS

| | | | |
|---|---|---|---|
| 5,186,996 A | 2/1993 | Alts | 428/72 |
| 5,196,253 A | 3/1993 | Mueller et al. | 428/138 |
| 5,266,374 A | 11/1993 | Ogata | 428/77 |
| 5,318,837 A | 6/1994 | Yoshinaka et al. | 428/328 |
| 5,401,449 A | 3/1995 | Hill et al. | 264/46.4 |
| 5,409,648 A | 4/1995 | Reidel | 264/45.1 |
| 5,426,898 A | 6/1995 | Larsen | 52/58 |
| 5,438,806 A | 8/1995 | Reinhall | 52/167.1 |
| 5,474,840 A | 12/1995 | Landin | 428/450 |
| 5,489,180 A | 2/1996 | Ichihara et al. | 411/544 |
| 5,509,247 A | 4/1996 | Fortez et al. | 52/630 |
| 5,518,385 A | 5/1996 | Graff | 425/127 |
| 5,556,711 A | 9/1996 | Ajioka et al. | 428/460 |
| 5,590,524 A | 1/1997 | Moore, III et al. | 60/323 |
| 5,614,285 A | 3/1997 | Gardill | 428/156 |
| 5,622,662 A | 4/1997 | Veiga et al. | 264/45.3 |
| 5,695,867 A * | 12/1997 | Saitoh et al. | 428/219 |
| 5,858,521 A | 1/1999 | Okuda et al. | 428/219 |

* cited by examiner

VIBRATION DAMPENING LAMINATE

RELATED APPLICATION

This application is a continuation of U.S. patent application Ser. No. 08/968,930, filed Nov. 12, 1997, the disclosure of which is incorporated herein by reference in its entirety as if set forth fully herein.

FIELD AND BACKGROUND OF THE INVENTION

The present invention relates to a vibration dampening laminate, and particularly a vibration dampening laminate for use in a vehicle interior.

Soundproofing in vehicles, particularly consumer automobiles and trucks, is a primary concern of automakers inasmuch as "quiet" cars have become more and more popular. Conventionally, sound insulation pads are placed on surfaces of the bodywork, for example, on the floor, in the roof, on the fire wall and the like. The intent of the insulation pad is to deaden sounds and lessen vibration that are caused by movement of the vehicle, engine operation and any moving parts.

In general, soundproofing can be broken down into sound insulation, sound absorption, vibration dampening and vibration insulation. Sound insulation is typically accomplished by intercepting sound waves on the way of their transmission so that a transmitted sound level is made smaller than an initial sound level. Materials capable of reducing the sound energy are usable as a sound insulating material whose characteristics are determined by surface density, rigidity in bending and internal loss. In a given frequency region, a larger weight results in a higher sound insulating effect. Thus it is known to use high density resin mixtures in which large amounts of metallic powder, calcium carbonate, glass fibers or other fillers are incorporated. It is also konwn to impregnate a foamed material with asphalt such as described in Japanese patent application laid-open No. 18538/1986.

Sound absorption is accomplished by an absorption of vibration energy of sound as a heat energy by utilizing the viscosity resistance or frictional resistance of a high void material so that reflection of sound waves is made small. Examples of such materials include open cell foamed plastics, fiberglass, asbestos, and the like.

The vibration damping is typically accomplished by absorbing the energy of vibrations or sounds transmitted through material as a heat energy converted as a result of deformation in shear or compression of the material. The vibration damping material should favorably have a high loss coefficient and a high modulus of elasticity. The vibration damping material is usually used after attachment to or coating on vibrating plates. Two types of the damping are known including a restriction type where a panel is attached on the vibration damping material and a non-restriction type where no panel is used. Typical of the restriction type are vibration-damping steel sheets or plates of various types. Other vibration damping materials include resins in which large amounts of particles such as ferrites, metals, ceramics, various flakes such as talc, mica and the like, and various fibers such as wollastonite and glass fibers are included.

Although such techniques are known there remains a demand for improvement in the areas of sound deadening and vibration dampening. Moreover, the need for such techniques to be lightweight without being unduly expensive has become critical.

SUMMARY OF THE INVENTION

To this end, the present invention provides a vibration dampening laminate that is lightweight and has superior sound insulation and vibration dampening properties. The vibration dampening laminate comprises a foil constraining layer, a viscoelastic layer, a foam spacing layer and a pressure sensitive adhesive layer including a release layer. The pressure sensitive adhesive layer and release layer are contoured to fit a profile of the article being soundproofed and vibration dampened such as a floorpan of a vehicle interior. A decorative fabric layer may be placed on or bonded to the foil constraining layer. A particularly suitable fabric layer is a backed or unbacked carpet layer. The overall weight of the laminate is low, and 20 to 30 pounds can be reduced from the overall weight of the vehicle as compared to conventional means for sound deadening and vibration dampening.

BRIEF DESCRIPTION OF THE DRAWINGS

Some of the objects and advantages of the present invention having been stated, others will appear as the description proceeds, when considered in conjunction with the accompanying drawings, in which.

DETAILED DESCRIPTION OF THE PREFERRED EMBODIMENTS

Figure 1:
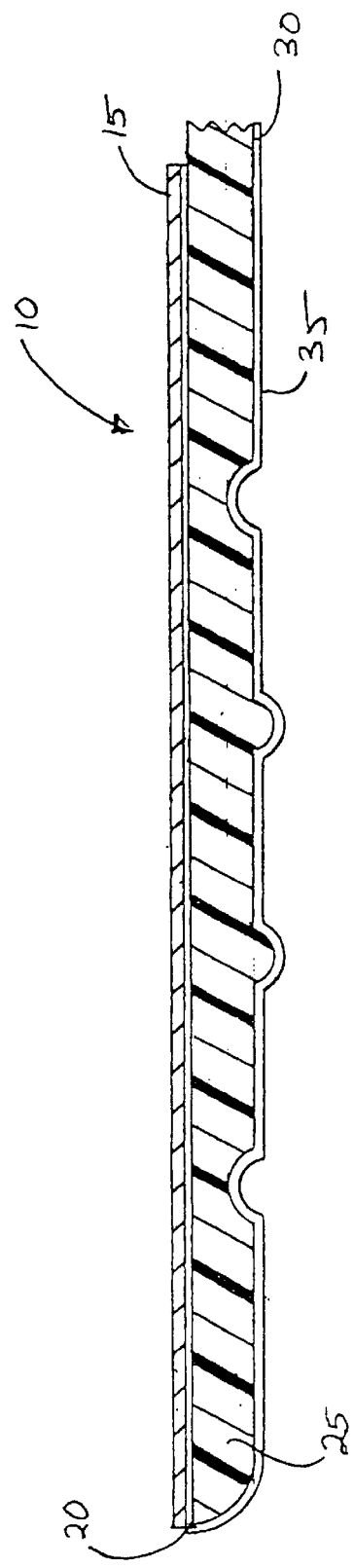
FIG. 1 is an enlarged sectional view taken through a portion of the vibration dampening laminate of the present invention.
Figure 2:
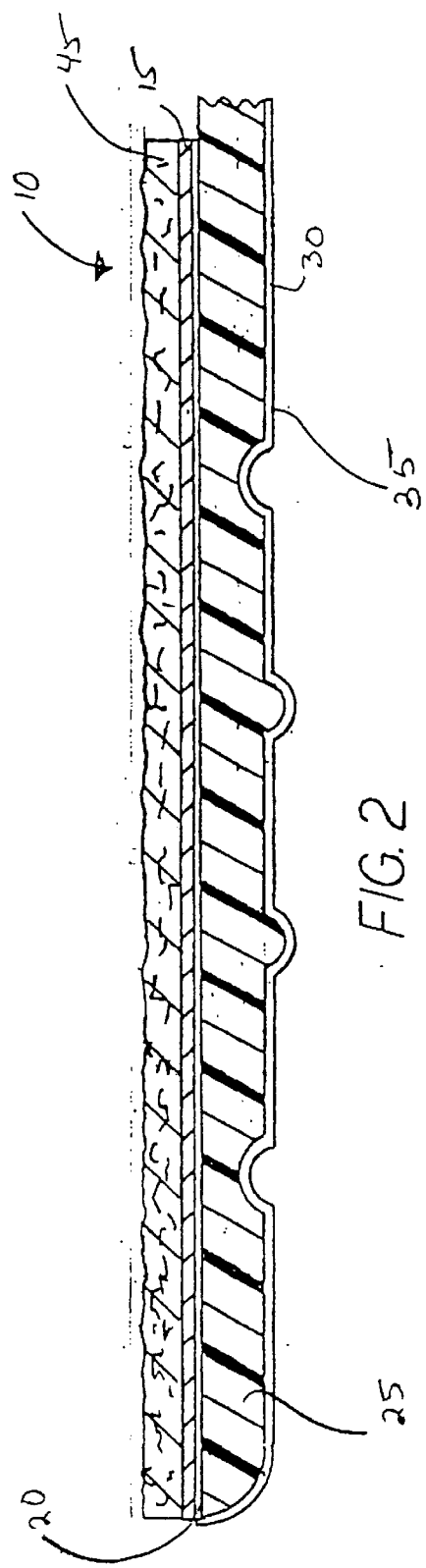
FIG. 2 is a greatly enlarged sectional view taken through a portion of the vibration dampening laminate of an alternative embodiment of the present invention.

Referring specifically to the drawings and particularly FIGS. 1 and 2, reference numeral 10 designates the vibration dampening laminate of the present invention. The vibration dampening laminate 10 comprises a constraining layer 15, a viscoelastic layer 20, a foam spacing layer 25 and a pressure sensitive adhesive layer 30 including a release layer 35.

The constraining layer 15 dampens vibration by means of shear deformation. The constraining layer 15 is a material that is stiff enough to induce shear in the viscoelastic layer 20 without itself experiencing excessive stretch. Suitable constraining layers are thin and are typically foils of various materials. For example, aluminum, paper (e.g., cardboard, paperboard with the proviso that it be waterproof), plastic, nylon and the like can be used. A preferred constraining layer 15 is an aluminum foil layer. The constraining layer typically has a thickness of about 0.001 to 0.010 inches, and preferably about 0.003 to 0.005 inches.

The viscoelastic layer 20 is a material that permits shear to occur. Various polymers may be used, the selection of which will be within one skilled in the art. Preferably the polymers have inherent adhesive properties although a non-adhesive polymer viscoelastic layer can be made to have adhesive properties by coating, spraying, etc. a suitable adhesive onto the viscoelastic layer. Suitable polymers include natural and synthetic rubbers, acrylic ester polymers and copolymers, such as copolymers with styrene, vinylidene chloride, vinyl acetate polymers and copolymers, polyvinyl alkyl ethers, water-dispersible polyurethanes, and copolymers of butadiene with styrene, acrylonitrile or methylmethacrylate. Suitable acrylic esters include alkyl acrylates and methacrylates, such as methyl acrylate, ethyl acrylate, propyl acrylate, isopropyl acrylate, butyl acrylate, t-butyl acrylate, hexyl acrylate, heptyl acrylate, 2-ethyl hexyl acrylate, decyl acrylate, dodecyl acrylate, methyl methacrylate, ethyl methacrylate, n-butyl methacrylate and the like. Acrylic acid esters of non-tertiary alcohols may also be used with alcohols including, for example, 2-methylbutanol, 3-methylbutanol, 2-ethylbutanol, 4-methylpentanol, 2-propyl-pentanol, n-hexanol, 2-methylhexanol, 4-methylhexanol, 2-hexanol, 2-ethylhexanol, 4-ethylhexanol, 4-methyl-2-pentanol, 2,3,4-triethylhexanol, 2-ethyl-3-methylhexanol, 2-heptanol, 3-heptanol, 3-methylheptanol, 2-ethylheptanol, 2-methyl-4-ethylheptanol, n-octanol, isooctanol, n-decanol, n-dodecanol, 10-chlorodecanol, and 6-methoxyhexanol.

The foam spacing layer 25 is used to separate the foil constraining layer from base structure, i.e., the vehicle bodywork. Preferably, the foam spacing layer 25 is sufficiently shear stiff that the viscoelastic dampening material (viscoelastic adhesive layer 20) experiences all of the shear strain. Preferably, the foam has a flexular modulus of about 10 to 300,000 psi. Suitable foams include polyurethane, PVC, polyethylene, polypropylene, EPS, EPP, polyamides, polyimides, melamine and the like. Polyurethane foam is preferred because of its low cost, low weight and structural rigidity. A preferred specific polyurethane foam is available from Foamex Canada, Toronto, Ontario. Another suitable polyurethane foam is described in U.S. Pat. No. 4,508,774 to Grabhoefer et al., the disclosure of which is incorporated herein by reference in its entirety. The foam thickness is preferably about 0.05 to 1.0 inches, and more preferably about 0.20 to 0.60 inches.

A wide variety of adhesives may be used for the pressure sensitive adhesive layer 30. Preferably, this pressure sensitive adhesive layer 30 is repositionable. The adhesive layers may be the same or different polymers as compared to the viscoelastic adhesive layer 20. These materials may include natural and synthetic rubbers, acrylic ester polymers and copolymers, such as copolymers with styrene, vinylidene chloride, vinyl acetate polymers and copolymers, polyvinyl alkyl ethers, water-dispersible polyurethanes, and copolymers of butadiene with styrene, acrylonitrile or methylmethacrylate. Suitable acrylic esters include alkyl acrylates and methacrylates, such as methyl acrylate, ethyl acrylate, propyl acrylate, isopropyl acrylate, butyl acrylate, t-butyl acrylate, hexyl acrylate, heptyl acrylate, 2-ethyl hexyl acrylate, decyl acrylate, dodecyl acrylate, methyl methacrylate, ethyl methacrylate, n-butyl methacrylate and the like. Acrylic acid esters of non-tertiary alcohols may also be used with alcohols including, for example, 2-methylbutanol, 3-methylbutanol, 2-ethylbutanol, 4-methylpentanol, 2-propylpentanol, n-hexanol, 2-methylhexanol, 4-methylhexanol, 2-hexanol, 2-ethylhexanol, 4-ethylhexanol, 4-methyl-2-pentanol, 2,3,4-triethylhexanol, 2-ethyl-3-methylhexanol, 2-heptanol, 3-heptanol, 3-methylheptanol, 2-ethylheptanol, 2-methyl-4-ethylheptanol, n-octanol, isooctanol, n-decanol, n-dodecanol, 10-chlorodecanol, and 6-methoxyhexanol.

A particularly preferred adhesive for both layers is Flexcryl 1625 available from Air Products and Chemicals, Inc., Allentown, Pa., and is a high solids, water-based acrylic. The thickness of the viscoelastic adhesive layer 20 is about 0.005 to 0.010 inches. The thickness of the pressure sensitive adhesive layer 30 is about 0.005 to 0.010 inches.

The pressure sensitive adhesive layer 30 includes a release layer 35. The release layer protects the adhesive from dirt and the like, and permits the adhesive layer 30 to retain its tackiness prior to use. Suitable release layers include linear low density polyethylene, polypropylene, and wax or silicone coated kraft paper, and the like. The particularly preferred release layer 35 comprises linear low density polyethylene available from Fox River Associates.

As shown in FIG. 2, the vibration dampening laminate 10 may include a decorative fabric layer 45. The decorative fabric layer can be a woven or non-woven fabric of the type commonly used in automotive interiors. For example, the layer can be carpet with or without a backing layer.

The vibration dampening laminate can be made using conventional techniques. For example, in a thermoforming process, a foam spacing layer blank of predetermined dimension is fed through a curtain coater to apply the viscoelastic layer 20. The adhesive is cured (e.g., using an oven). The constraining layer is applied. The foam spacing layer/viscoelastic layer are stacked and then preheated prior to thermoforming using a mold or tool. A combined release layer/pressure sensitive layer is placed in the mold or tool, the foam spacing layer/viscoelastic layer placed opposite thereto, and all is pressed to the desired shape.

The vibration dampening laminate 10 can also be molded using a polyurethane reaction injection molding technique. The laminate 10 is molded so that the product, particularly the pressure sensitive adhesive layer 25 is molded to the contour of the article where the laminate 10 is being placed. In operation, the pressure sensitive adhesive layer including the release layer 35 is positioned on a profiled mold half and the foil constraining layer 15 and decorative fabric layer 45 is positioned toward the flat mold half. A vacuum is drawn to pull the pressure sensitive adhesive layer 30 and release layer 35 to conform it to the profiled mold half. The foam is injected into mold through an injection port to fill the cavity.

Although the invention has been described relative to its use in vehicles, it is understood that the vibration dampening laminate of the present invention could also be employed in railroad vehicles, airplanes, washing machines, refrigerators, key boards, vacuum cleaners, generators, stereo equipment, printers and the like.

The following example illustrates a specific embodiment of the present invention. In the example and throughout the specification, all parts and percentages are by weight, unless otherwise indicated

EXAMPLE

Figure 3:
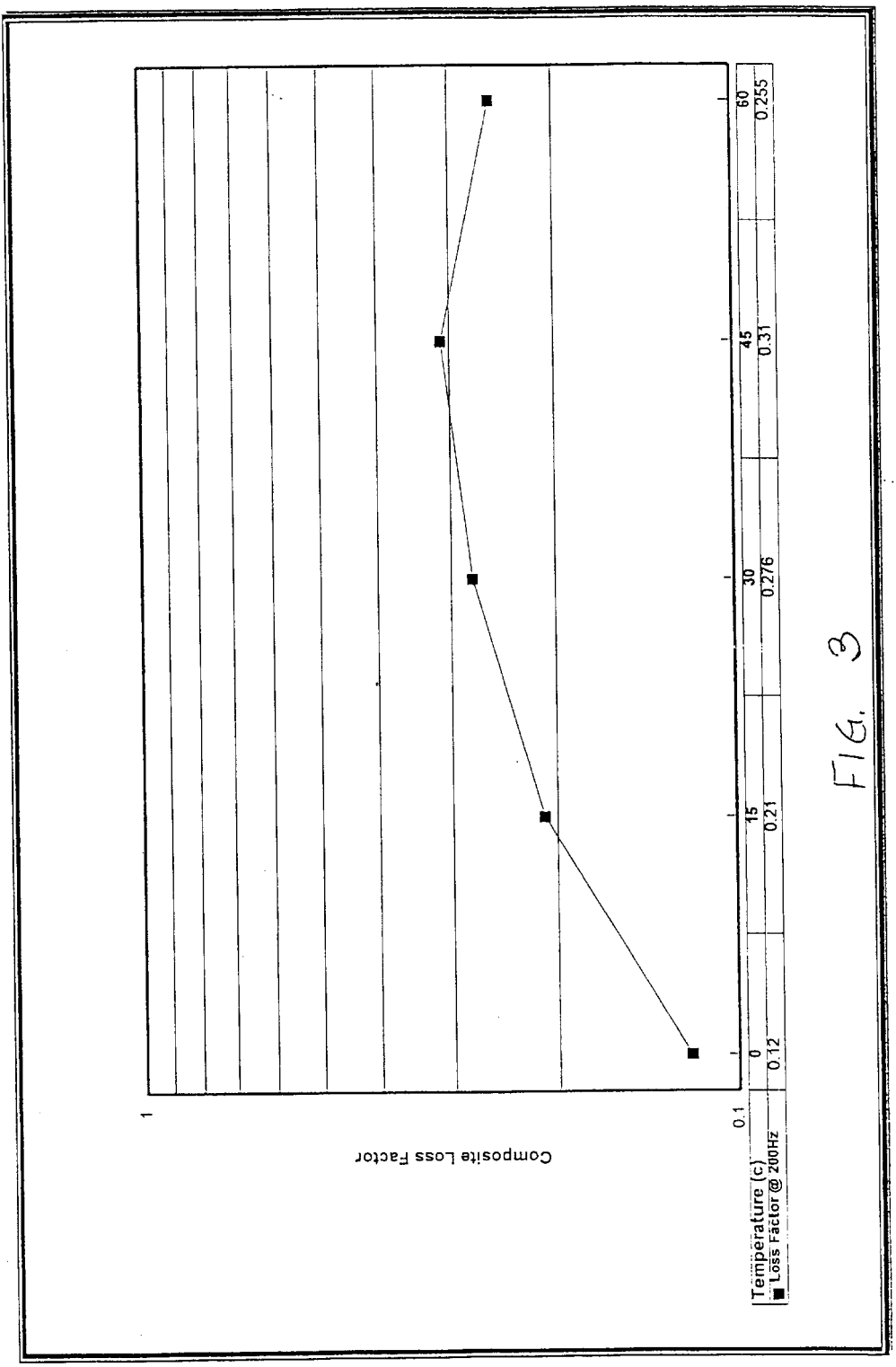
FIG. 3 is a graph of the Oberst Beam Test results in accordance with a vibration dampening laminate of the present invention and in accordance with Example 1.

A laminate comprising a 0.002 inch thick A. J. Oster aluminum foil, 0.006 inch thick Air Products 1625 acrylic viscoelastic layer, a 0.5 inch thick Foamex International polyurethane foam, a 0.006 inch thick Air Products 1625 acrylic to pressure sensitive layer and a 0.002 inch Fox River Associates release layer is provided. An ASTM E-756 Obert Beam measurement is made at various temperatures as shown in FIG. 3. The vibration dampening laminate has improved dampening properties as compared to conventional means for dampening.

While various embodiments have been disclosed and described herein, it will be appreciated that various changes and modifications can be made by those skilled in the art without departing from the true spirit and scope of the invention, as defined in the following claims.

That which is claimed:

1. A vibration dampening laminate for vehicular use, comprising:
   a polyurethane foam spacing layer having a flexular modulus of 10 to 300,000 psi and a thickness of about 0.1 inches to 1.0 inches, wherein the polyurethane spacing layer has opposite first and second surfaces;

a foil constraining layer adhesively secured to the first surface of the polyurethane foam spacing layer via a viscoelastic adhesive layer disposed therebetween, wherein the foil constraining layer comprises aluminum foil and has a thickness of between about 0.001 inches and about 0.01 inches;

a decorative fabric layer secured to the foil constraining layer;

a pressure sensitive adhesive layer disposed on the polyurethane foam spacing layer second surface; and a release layer disposed on the pressure sensitive adhesive layer;

wherein the pressure sensitive adhesive layer and release layer are contoured to fit a profile of a portion of a vehicle; and wherein the laminate is sufficiently shear stiff such that the viscoelastic adhesive layer experiences substantially all shear strain when the laminate is subjected to shear forces.

2. The vibration dampening laminate of claim 1, wherein the fabric layer comprises a carpet layer.

3. The vibration dampening laminate of claim 1, wherein the pressure sensitive adhesive layer comprises a water-based acrylic adhesive.

4. The vibration dampening laminate of claim 1, wherein the viscoelastic layer comprises a water-based acrylic.

5. The vibration dampening laminate of claim 1, wherein the vehicle portion comprises a floorpan of a vehicle.

* * * * *